United States Patent

Eide

[15] 3,688,206
[45] Aug. 29, 1972

[54] AC BRIDGE AND DETECTOR CIRCUIT
[72] Inventor: Melvin O. Eide, Bellevue, Wash.
[73] Assignee: United Control Corporation
[22] Filed: Sept. 28, 1970
[21] Appl. No.: 76,050

[52] U.S. Cl. .................329/204, 307/321, 324/60 R, 324/57 R, 324/61 R, 329/166, 329/198, 340/200
[51] Int. Cl. .............................................H03d 1/10
[58] Field of Search......329/166, 198, 199, 141, 204; 307/321; 324/61 B, 60 B, 57 B; 340/200

[56] References Cited

UNITED STATES PATENTS

| | | | |
|---|---|---|---|
| 3,435,317 | 3/1969 | Osborn | 340/200 X |
| 3,012,192 | 12/1961 | Lion | 324/57 B |
| 3,278,919 | 10/1966 | Fleming | 307/321 X |
| 2,968,031 | 1/1961 | Higa | 329/198 UX |
| 3,318,153 | 5/1967 | Lode | 324/61 B |

Primary Examiner—Alfred L. Brody
Attorney—Hofgren, Wegner, Allen, Stellman & McCord

[57] ABSTRACT

A servoed transducer system includes an AC bridge and detector circuit in which differentially variable, linear sensing impedances are connected in a basic AC bridge configuration using solely linear impedances. Movement of a pivoted seismic mass varies the impedances of the differential sensing impedances, unbalancing the AC bridge and generating a pair of cyclic signals coupled to a detector circuit which includes a pair of nonlinear rectifiers connected through resistive means to a summing junction. An integrator connected to the summing junction produces an error voltage which is amplified in a servo amplifier and used to power a torque coil which generates a magnetic field to rebalance the seismic mass.

8 Claims, 7 Drawing Figures

INVENTOR
Melvin O. Eide
BY Hofgren, Wegner, Allen, Stellman & McCord
ATTORNEYS

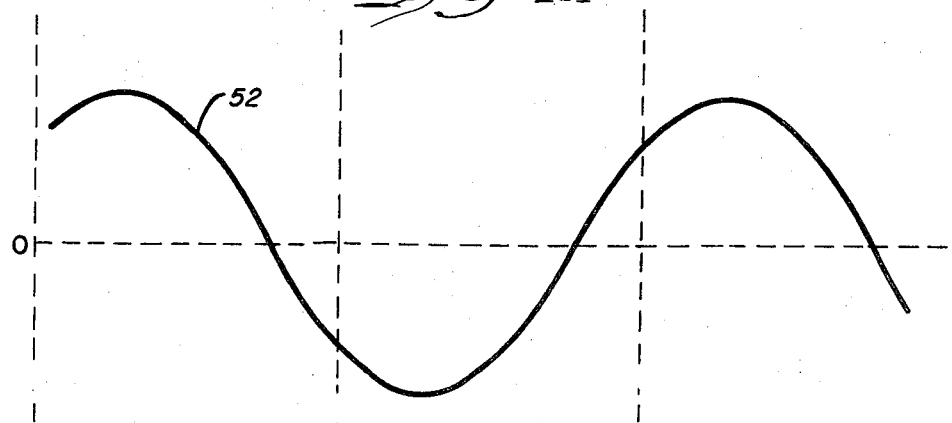
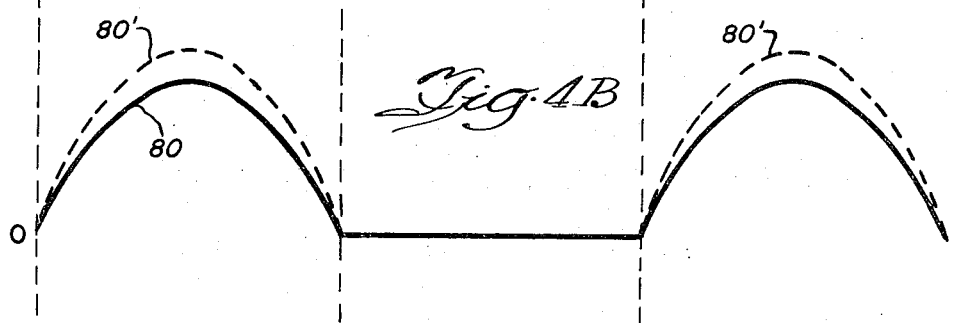
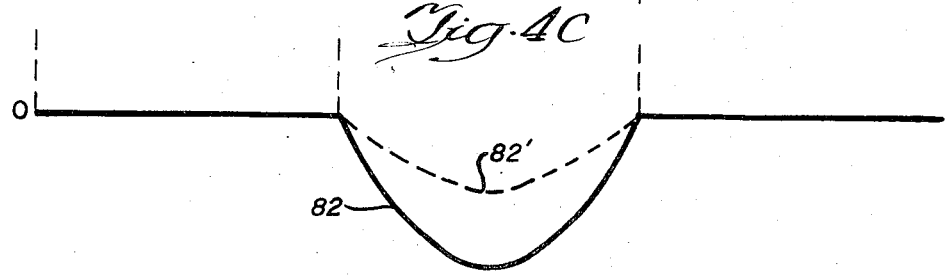
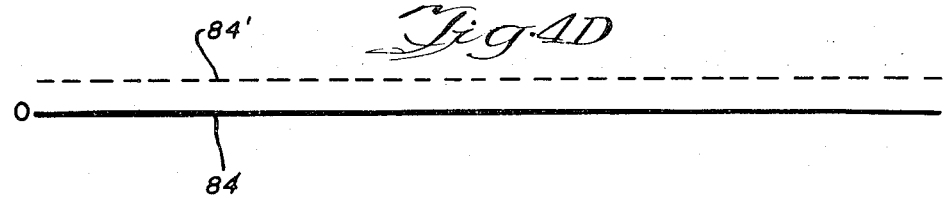

AC BRIDGE AND DETECTOR CIRCUIT

This invention relates to an improved sensor and detector circuit in which a basic AC bridge configuration is constructed using only linear impedance elements.

Servoed transducer systems typically use linear variable impedance elements to sense movement of a seismic element. A change in impedance is detected by an AC bridge and detector circuit in order to generate an error signal which is amplified and coupled to a balancing or torque coil to produce a rebalance force which nulls the external unbalance force. The amount of the locally generated rebalance force provides a measure of the external unbalance force acting on the seismic element. One example of such a servoed transducer system is an accelerometer of the closed loop pendulous design, in which a pair of differential sensing capacitors are mounted to the pendulous seismic mass. Movement of the seismic mass causes a differential change in capacity, which is detected in the AC bridge and detector circuit in order to generate an output error signal proportional to the difference in capacity.

Prior AC bridge and detector circuits generally used nonlinear rectifiers connected in series within a basic bridge configuration connected across a sinusoidal input source. Typically, energy storage elements such as capacitors or inductors were necessary within the basic bridge configuration in order to produce an operative circuit. For example, differential sensing capacitors would be located in opposed legs of the AC bridge and connected through series diodes to charge over one portion of the 360° input cycle, and discharge over the remaining potion of the 360° input cycle. Such prior circuits unnecessarily limited the types of sensing elements which could be used.

In accordance with the present invention, a greatly simplified AC bridge and detector circuit is disclosed. The AC bridge may use, but does not require, energy storage elements; nor does the AC bridge require nonlinear rectifying elements located in series within a basic bridge configuration, although nonlinear rectifying elements can, if desired, be located in parallel across parts of the basic bridge circuit. Furthermore, the output of the circuit is readily adapted to drive conventional servo amplifiers.

One object of this invention is the provision of an improved AC bridge and detector circuit which eliminates nonlinear rectifying elements located in series within the basic AC bridge configuration.

Another object of this invention is the provision of an improved AC bridge and detector circuit which does not require energy storage elements within the basic AC bridge configuration, but can use any linear impedance elements including both energy storage and non-storage types.

Further objects and features of the invention will be apparent from the following description, and from the drawings, in which:

FIG. 4A–D illustrate waveforms for electrical signals found in the circuit of FIG. 2.

Figure 1:
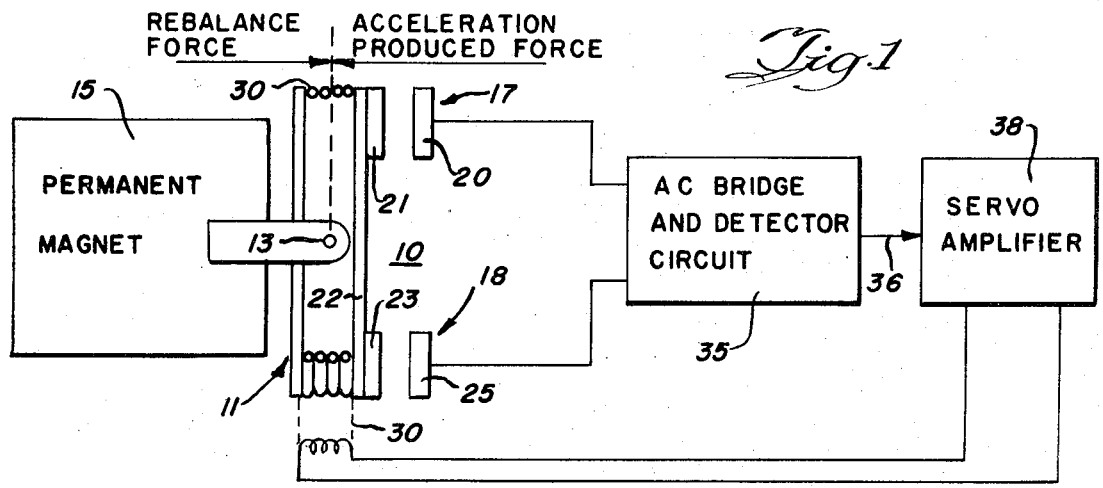
FIG. 1 is a block diagram of the invention in combination with an exemplary type of servoed transducer system.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated.

Turning to FIG 1, a servoed transducer 10 for measuring a force quantity uses a seismic element 11 pivotally mounted at 13 to a frame structure which includes a permanent magnet 15. Transducer 10 may take the form of a force balanced accelerometer having a pendulous seismic mass which moves in response to acceleration. To detect movement of seismic element 11, any variable linear sensing impedance may be associated in a known manner with the seismic mass so that movement of the mass varies the impedance of the sensing element.

For example, a pair of differential sensing capacitors 17 and 18 may be located between the seismic mass 11 and the frame structure. Capacitor 17 is formed from a plate 20 fixed to the frame by conventional means (not illustrated) and a plate 21 fixed to a metallic member 22 on seismic mass 11. Member 22 has on an opposed end a plate 23 forming a part of capacitor 18. Capacitor 18 includes a further plate 25 aligned opposite the plate 23 and fixed to the frame structure by any conventional means (not illustrated). Member 21 desirably forms the top plane surface of a bobbin around which is located a rebalancing device, as a torque coil 30.

Movement of pivoted seismic mass 11 is produced by an external acceleration force, and produces a differential change in capacity in sensing capacitors 17 and 18. The capacitors are connected to a novel AC bridge and detector circuit 35 which, in response to the change in capacity, generates on an output line 36 an output error signal proportional to the change in capacity. In response to the error signal, a servo amplifier 38 of conventional design generates a current which flows through the torque coil 30 to generate a magnetic field. The locally generated magnetic field interacts with the magnetic field of permanent magnet 15 to produce a rebalance force which returns the seismic mass 11 to its balanced or null position. The electronically generated rebalance force is thus equal and opposite to the acceleration force, and maintains the pendulum 11 in a fixed position captured mode. Servo amplifier 38 may include a known output circuit which detects the magnitude of current through torque coil 30 and generates a proportional voltage output which directly indicates the acceleration force. By way of example, the servo amplifier 38 may take the form disclosed in copending application "Servoed Transducer System", Ser. No. 966, filed Jan. 6, 1970, applicant Burton J. Thompson, and assigned to the same assignee as this application.

Figure 2:
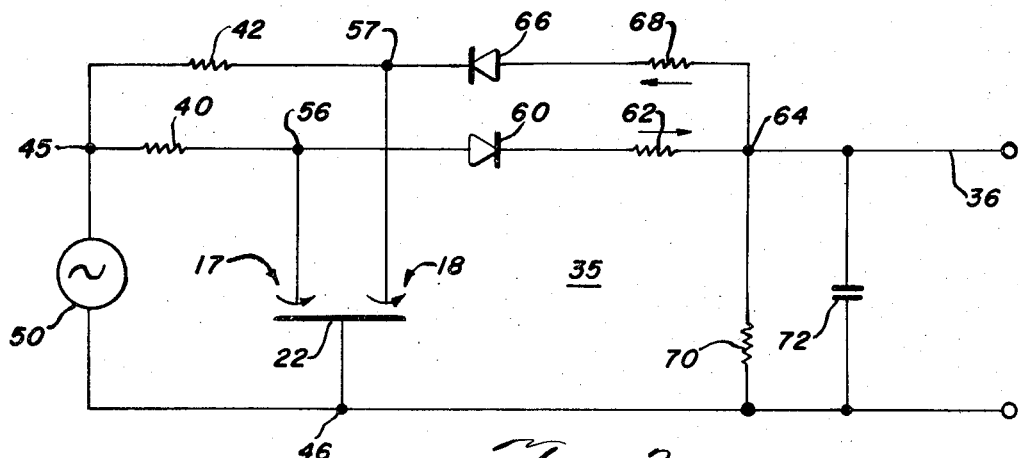
FIG. 2 is a schematic diagram of one embodiment of the invention shown in block form in FIG. 1.

In FIG. 2, one embodiment of the novel AC bridge and detector circuit 35 is illustrated in detail. A basic bridge configuration is formed by a first current path, which includes a linear impedance as a resistor 40 in series with capacitor 17, in parallel with a second current path, which includes a linear impedance as a resistor 42 in series with capacitor 18. The pair of current paths are connected in parallel between an input junction 45, which joins resistors 40 and 42, and an input junction 46, which is connected to the metallic plate 22 which serves as a common electrical connection for the pair of capacitors 17 and 18. While differential sensing capacitors are illustrated, it is not essential that energy storage elements be included in the basic bridge configuration formed by the dual current paths between input junctions 45 and 46. Thus, variable resistors or variable inductors could be used in place of the capacitors, all of which comprise linear variable impedances.

To detect the change in capacity, the input terminals 45 and 46 are connected across a source 50 of sinusoidal signal, typically above 10 megahertz frequency. The AC waveform 52 from source 50 is illustrated in FIG. 4A, and comprises a cyclically recurring signal varying in positive and negative directions about a zero level.

Returning to FIG. 2, a junction 56 between resistor 40 and capacitor 17, and a junction 57 between 18, form resistor 42 and capacitor 18, terminals for the basic bridge configuration. A detector circuit, connected to the output terminals 56 and 57 includes a nonlinear element as a diode rectifier 60 in series with a resistor 62 connected to a summing junction 64. A second nonlinear impedance, as a diode rectifier 66 is connected in series with a resistor 68 connected to the summing junction 64. Junction 64 is directly coupled to output line 36, and is shunted to the bridge output junction 46, which serves as a reference potential point, through a parallel connected resistor 70 and capacitor 72 which form an integrator. The time constant of the RC integrator 70, 72 is chosen to be sufficiently large to adequately filter the signal at summing junction 64. Desirably, the RC time constant of resistors 40 and 42 and differential sensing capacitors 17 and 18, within the basic bridge configuration, is chosen to be approximately equal to the period of the sinusoidal source 50.

The operation of the circuit 35 of FIG. 2 may be understood with reference to the waveforms in FIG. 4. As the sinusoidal source 50 produces a waveform 52 which is positive going with respect to input terminal 45, the rectifier 60 conducts, producing a current flow through resistor 62 indicated by the waveform 80 in FIG. 4B. Current waveform 80 flows in a positive direction for approximately a half cycle, having a time lag produced by the RC time constant of the bridge path comprising resistor 40 and capacitor 17. During the next half cycle, current ceases to flow since the diode 60 is back biased. An opposite current flow is produced in the other bridge path connected to diode 66. A current 82, FIG. 4C, flows during the half cycle when current is blocked in the bridge path connected to diode 60. When the bridge is balanced, the equal but opposite currents 80 and 82 cancel over a 360° cycle period, resulting after integration in a voltage waveform 84, FIG. 4D, on line 36. The waveforms 80 and 82 in FIGS. 4B and C are illustrated for clarity as being sinusoidal and having the same waveform as the signal source, but shifted in time. This condition would occur if the nonlinear network comprising diodes 60 and 66, resistors 62, 68 and 70, and capacitor 72, would not load the basic bridge configuration. In practice, the network will load the basic bridge configuration, causing some nonsymmetry in the waveforms 80 and 82.

When the AC bridge becomes unbalanced, the waveforms in FIGS. 4B-D vary depending upon the direction of unbalance. Assuming an acceleration produced force causes seismic mass 11, FIG. 1, to rotate in a counterclockwise direction about the pivot 13, the capacitance of capacitor 17 decreases, and the capacitance of capacitor 18 increases. As a result, the current through resistor 62 increases as shown by the dashed lines 80' in FIG. 4B. On the next alternate half cycle, the current through resistor 68 decreases, as shown by the dashed lines 82' in FIG. 4C. Since the waveforms do not cancel over a 360° cycle, the filtered current at junction 64 increases in a positive direction, as illustrated by the dashed line 84', FIG. 4D. This produces a positive error voltage on line 36 proportional to the differential change in capacity. The error voltage is amplified in servo amplifier 38, FIG. 1, and generates a rebalance current through coil 30 sufficient to produce a rebalance force which rotates the seismic mass 11 in a clockwise direction until the distances between the capacitor plates 20–21 and 25–23 are equal.

Figure 3:
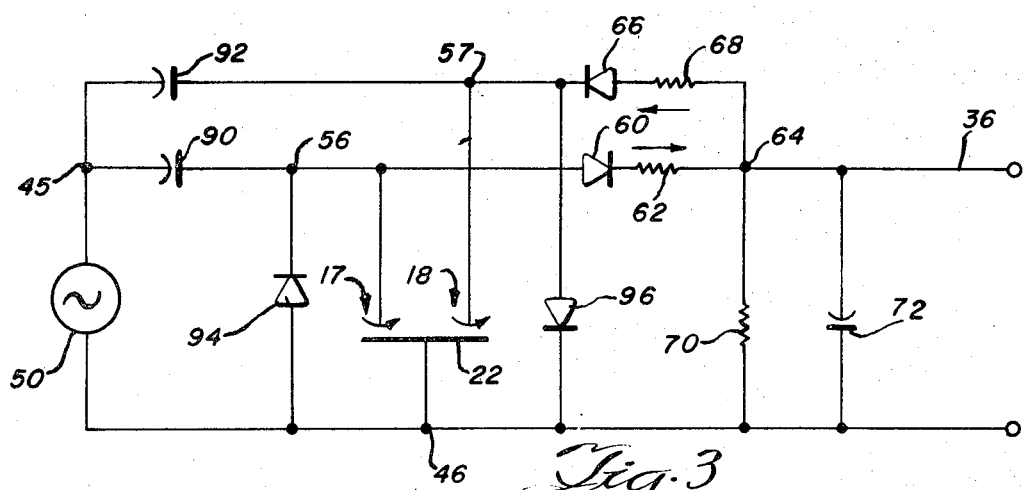
FIG. 3 is a schematic diagram of another embodiment of the invention shown in block form in FIG. 1.

In FIG. 3, another embodiment of the novel AC bridge and detector circuit 35 is illustrated, which allows AC coupling to the signal source 50. In this figure, elements similar in function to the elements in FIG. 2 have been identified by the same reference numeral. The resistors 40 and 42 of FIG. 2 have been replaced by capacitors 90 and 92, respectively, forming a pair of current paths to source 50 formed by using only linear impedances. Namely, capacitors 90 and 17 form one current path, and capacitors 92 and 18 form the other current path. Each current path is shunted by a further current path using nonlinear impedance means. Capacitor 17 is shunted by a diode 94, and capacitor 18 is shunted by diode 96, poled oppositely to diode 94. In FIG. 3, a complete bridge is formed using capacitors, resulting in a higher sensor gain, and allowing separation of the return lines for source 50 and capacitors 17 and 18. That is, the place 22 may be returned to a different DC potential than the output line of source 50 which connects to input terminal 46. Desirably, the capacitance of capacitors 90 and 92 are equal, and are much larger than the capacitance of the sensing capacitors 17 and 18.

In operation, the diodes 94 and 96 cause the voltage across the capacitors 17 and 18 to be an offset sinusoid having a magnitude up to two times the peak potential of source 50. This increases the gain of the sensor circuit. Otherwise, the circuit operation is the same as previously described for FIG. 2. Diodes 94 and 96 can be eliminated, with some reduction in gain, to reduce the effect of input source frequency on sensor gain. If capacitors 17, 18, 90 and 92 were chosen to be of equal capacitance when the diodes 94, 96 were eliminated, the peak voltage across the capacitors 17 and 18 would approach one half of the peak voltage from source 50.

While the AC bridge and detector circuits 35 in FIGS. 2 and 3 have been illustrated in a servo transducer system, they may be used in any device requiring an electrical output which is a function of a sensed input force which can be transformed into a change in a linear impedance element.

I claim:

1. A circuit for detecting the relative value of two impedance elements, comprising:

an alternating current source;

a pair of circuits connected in parallel across said source, each circuit having in series therein a first impedance element and a second impedance element, the second impedance element in at least one of the circuits being variable;

a load;

a first diode connected in series with said load across the second impedance element of one of said circuits; and a second diode connected in series with said load across the second impedance element of the other circuit, said first and second diodes being poled to conduct current in opposite directions through said load whereby the load current is a function of the relative impedance of the second impedance elements of the first and second circuits.

2. The detector of claim 1 in which said second impedance elements are capacitors.

3. The detector of claim 2 in which said second impedance element capacitors comprise a differential capacitor having a common plate connected with said source and two individual plates, one in each of said pair of circuits.

4. The detector of claim 3 in which the junction of said common capacitor plate, source and load is connected with an electrical reference.

5. The detector of claim 2 in which the first impedance element of each of said circuits is a resistor.

6. The detector of claim 2 in which the first impedance element of each of said circuits is a capacitor.

7. The detector of claim 6 in which said first impedance capacitors are much larger than said second impedance capacitors.

8. The detector of claim 6 having a pair of diodes, one connected in parallel with the second impedance capacitor of each circuit, said parallel connected diodes being poled to conduct during the half cycle when the load circuit diode connected with the circuit is non-conductive, charging the first impedance capacitor substantially to twice the source potential.

* * * * *